US009261122B2

(12) United States Patent
Choy

(10) Patent No.: US 9,261,122 B2
(45) Date of Patent: Feb. 16, 2016

(54) TUBE CONNECTOR FOR FACILITATING A COVERED CONNECTION BETWEEN TWO OR MORE TUBES

(71) Applicant: Yau King Choy, Quarry Bay (HK)

(72) Inventor: Yau King Choy, Quarry Bay (HK)

(73) Assignee: Laudex Company Limited, Kernhill, Quarry Bay (HK)

( * ) Notice: Subject to any disclaimer, the term of this patent is extended or adjusted under 35 U.S.C. 154(b) by 272 days.

(21) Appl. No.: 13/935,646

(22) Filed: Jul. 5, 2013

(65) Prior Publication Data

US 2015/0008204 A1    Jan. 8, 2015

(51) Int. Cl.
| | |
|---|---|
| *F16B 9/02* | (2006.01) |
| *F16B 7/02* | (2006.01) |
| *A47B 47/00* | (2006.01) |
| *F16B 12/40* | (2006.01) |
| *F16B 12/50* | (2006.01) |
| *F16B 12/52* | (2006.01) |
| *F16B 12/44* | (2006.01) |

(52) U.S. Cl.
CPC .............. *F16B 9/026* (2013.01); *A47B 47/0008* (2013.01); *F16B 7/025* (2013.01); *F16B 12/40* (2013.01); *F16B 12/50* (2013.01); *F16B 12/52* (2013.01); *F16B 2012/443* (2013.01); *F16B 2012/446* (2013.01); *Y10T 403/557* (2015.01)

(58) Field of Classification Search
CPC ...... F16B 7/0046; F16B 7/044; F16B 7/1463; F16B 7/025; F16B 12/40; F16B 12/50; F16B 12/446; F16B 12/44; F16B 12/52; F16B 9/026; F16B 2012/443; F16B 2012/446; Y10T 403/55; Y10T 403/557; Y10T 403/341; Y10T 403/345; Y10T 403/7069; Y10T 403/344; A47B 47/0008
USPC .......... 403/169, 170, 171, 172, 173, 174, 297
See application file for complete search history.

(56) References Cited

U.S. PATENT DOCUMENTS

| | | | |
|---|---|---|---|
| 2,508,039 A | 5/1950 | Neuwirth | |
| 3,545,796 A * | 12/1970 | Nicholls | A47B 47/0008 403/187 |
| 3,695,649 A | 10/1972 | Laverone | |
| 3,912,410 A * | 10/1975 | Pofferi | A47B 47/03 108/192 |
| 4,856,929 A | 8/1989 | Smahlik et al. | |
| 4,958,953 A | 9/1990 | Charondiere | |
| 5,259,684 A | 11/1993 | Scharer | |

(Continued)

FOREIGN PATENT DOCUMENTS

| | | |
|---|---|---|
| DE | 8097657 | 8/1989 |
| DE | 9410897 | 7/1994 |

(Continued)

*Primary Examiner* — Patrick Hawn

(57) ABSTRACT

Tube connectors are provided for connecting tubes together to form a framework where the connectors are substantially hidden from view by ends of the tubes. Each connector has a support body and several anchor bodies that are formed integrally with the support body or independent from it. The support body has six faces with at most six anchor bodies. For any face of the support body that does not have an anchor body, it is formed to be coplanar with a surface of an adjoining anchor body, allowing an end of a tube with a suitably shaped end portion to cover that face of the support body. A U-shaped aperture with a slanted through passage are provided at a junction of at least one anchor body with the support body. This allows a tool to be inserted into the connector to fix a final tube to the connector.

23 Claims, 13 Drawing Sheets

(56) References Cited

U.S. PATENT DOCUMENTS

| | | | |
|---|---|---|---|
| 5,664,757 A * | 9/1997 | Simonis | F16M 5/00 211/189 |
| 6,202,663 B1 | 3/2001 | Uemura | |
| 6,357,960 B1 | 3/2002 | Cornelius | |
| 7,229,230 B2 | 6/2007 | Choy | |
| 7,241,072 B2 * | 7/2007 | Patrignani | F16B 7/025 403/170 |
| 7,762,695 B2 * | 7/2010 | Lanczy | F21V 21/005 362/217.13 |
| 2005/0002732 A1 * | 1/2005 | Choy | F16B 7/025 403/297 |

FOREIGN PATENT DOCUMENTS

| | | |
|---|---|---|
| DE | 19514752 | 10/1996 |
| DE | 29813772 | 1/1998 |
| FR | 2214497 | 8/1974 |
| GB | 1515297 | 6/1978 |
| GB | 2093517 | 9/1982 |

* cited by examiner

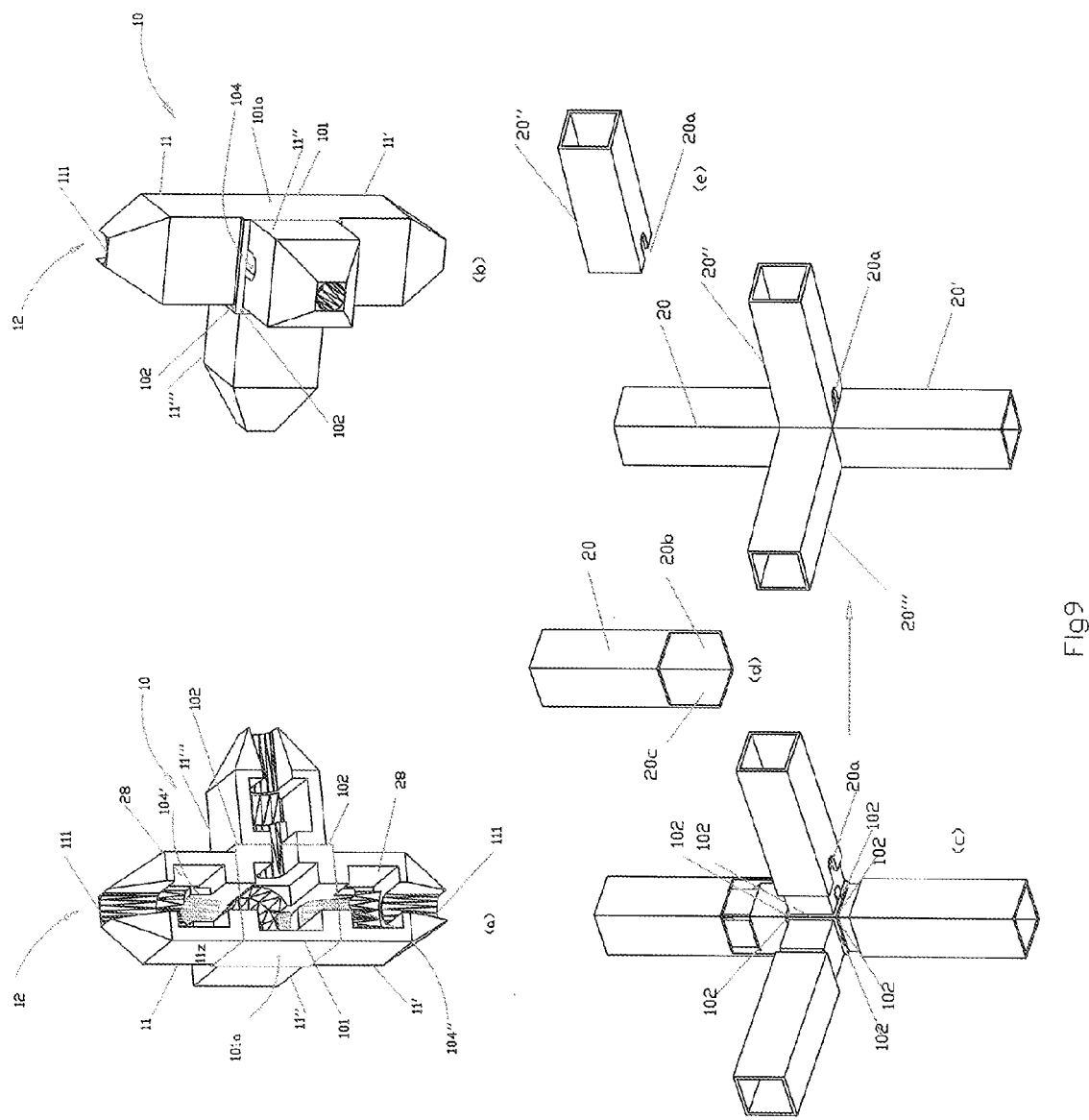

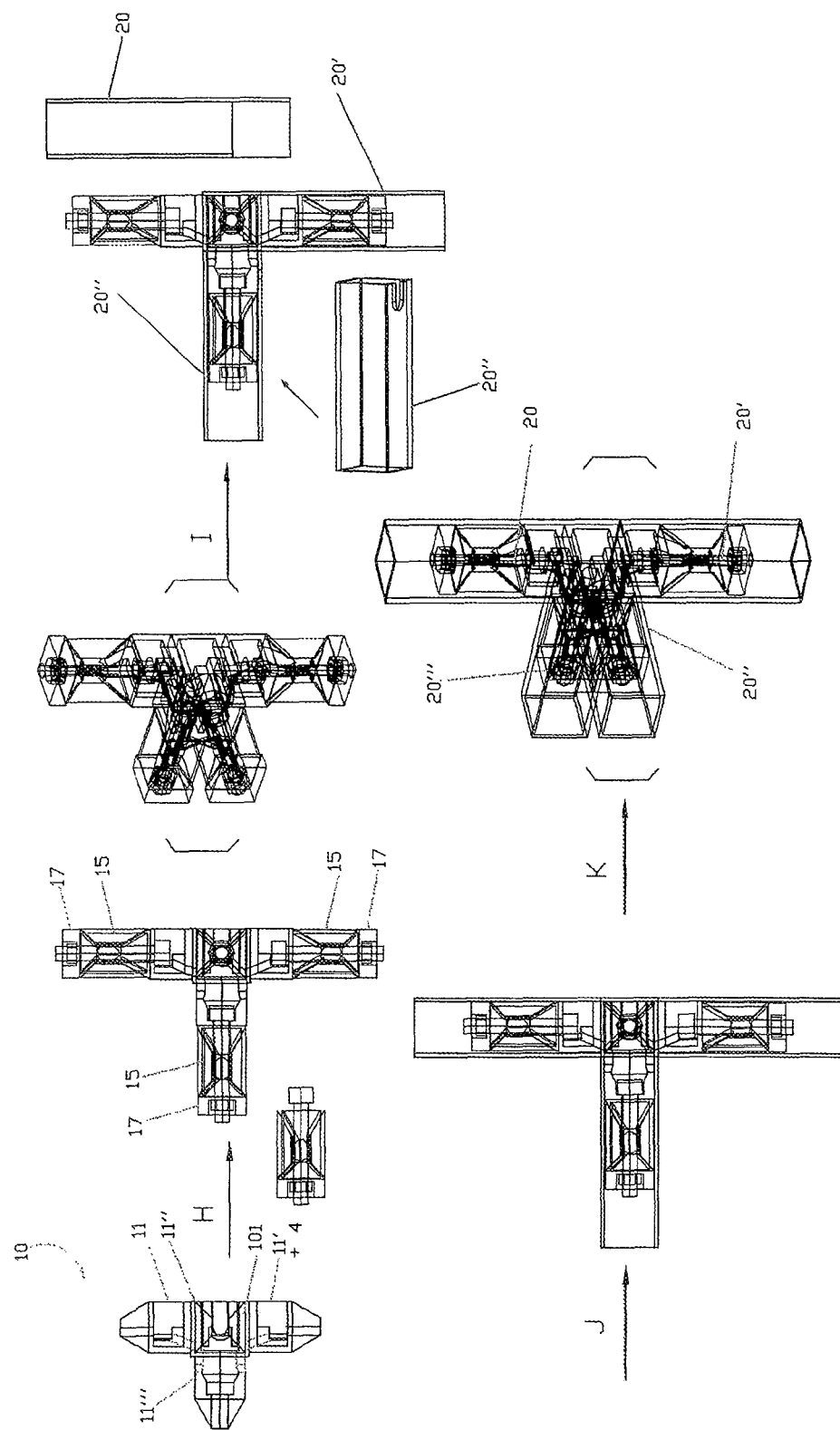

TUBE CONNECTOR FOR FACILITATING A COVERED CONNECTION BETWEEN TWO OR MORE TUBES

FIELD OF THE INVENTION

The present invention relates to a tube connector for facilitating a covered connection between two or more tubes. More particularly, although not exclusively, the invention relates to a tube connector for securing a pair of tubes in an end-to-end configuration, or for securing three or more tubes radiating from the connector in one or more planes such that the connector is largely hidden from view by the ends of the tubes connected together thereby. Such a connector might have application in constructing frameworks for shelving, metal framework such as scaffolding, and furniture construction for example.

BACKGROUND OF THE INVENTION

Known connectors for connecting tubes in an end-to-end configuration can be complicated in structure and therefore high in manufacturing cost. Furthermore, these known connectors are usually mounted between and outside the tubes and can be unsightly.

Applicant's U.S. Pat. No. 7,229,230 discloses a tube connector comprising a number of anchor bodies extending from a common box section. The common box section is larger in cross-section than that of the anchor bodies such that the common box section provides end faces against which plain end portions of tubes abut when the anchor bodies are positioned within proximal ends of the tubes. A consequence of this arrangement is that the common box section remains exposed to view and is unsightly, particularly where tube connectors as taught by U.S. Pat. No. 7,229,320 are used in constructing tube frameworks for shelving or the like. Furthermore, the exposed common box sections of the tube connectors are prone to gather dust and are difficult to clean.

OBJECTS OF THE INVENTION

An object of the invention is to mitigate or obviate to some degree one or more problems associated with known tube connectors.

The above object is met by the combination of features of the main claims; the sub-claims disclose further advantageous embodiments of the invention.

Another object of the invention is to overcome or substantially ameliorate the above disadvantages by providing an improved tube connector for connecting tubes in a 3-dimensional configuration where the connectors can be entirely or almost entirely hidden inside the connected tubes, i.e. hidden from view.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect of the invention, there is provided a tube connector for internal attachment to an end of a tube. The tube connector comprises a support body and at least one anchor body extending from said support body. The anchor body has a lengthwise through-passage. Associated with the anchor body is a tightening body having a lengthwise through-passage and an end face facing an end face of the anchor body. Also provided is an expansion body comprising a through-passage and a pair of opposed end faces, one of which bears against the end face of the anchor body and the other of which bears against the end face of the tightening body. An operating rod extends through the through-passages of the anchor body, the expansion body and the tightening body. The operating rod is arranged to draw the tightening body towards the anchor body to thereby cause the expansion body to expand radially outwardly to bear against an inside surface of the tube and fix the tube connector to the tube. The support body has at least one external surface which lies in a same or lower plane as that of a corresponding external surface of one of the at least one anchor body such that at least a part of said external surface of the support body can be covered from view by a suitably shaped end of the tube when it is connected to said one of the at least one anchor body.

The at least one external surface of the support body may lie in a same plane as that of one or more corresponding adjoining external surfaces of one or more anchor bodies such that at least a part of said support body external surface can be covered from view by suitably shaped ends of one or more tubes connected to respective ones of said one or more anchor bodies.

The support body may have two or more external surfaces that lie in the same planes as those of respective corresponding adjoining external surfaces of two or more anchor bodies where some of the two or more anchor bodies are perpendicular to each other.

The tube connector may comprise a plurality of anchor bodies formed integrally with the support body, the support body and the anchor bodies all being square in cross-section and each of the anchor bodies extending outwardly at a right angle from a respective support surface of the support body.

The support body may have a cross-sectional size that is equal or less than that of the at least one anchor body such that at least a part of the support body can be covered from view by a suitably shaped end of the tube when it is connected to said at least one anchor body.

By providing a support body that has at least one external surface lying in a same plane as a corresponding surface or an anchor body or a support body that is no greater in size than the anchor body provides the advantage that at least part of the support body can extend inside of the end portion of the tube and thus be concealed from view.

The at least one anchor body may be formed integrally with the support body. Alternatively, the at least one anchor body may be separately formed from the support body and attached thereto by any suitable fixture means.

Preferably, the support body has a cross-sectional size and shape that is identical to that of the anchor body such that at least a part of the support body can snugly fit within the end of the tube. In addition to enabling at least part of the support body to be covered from view, making the support body of a size and shape that fits snugly within an end of the tube provides the additional advantage of strengthening the tube connection formed between the tube connector and tube end.

In order to form frame structures for constructing shelving, furniture, scaffolding or the like, it is preferable that the tube connector is provided with at least first and second anchor bodies extending from said support body and such that at least upper and/or side surfaces of the support body are covered from view by end portions of two tubes interconnected by said tube connector. The first and second anchor bodies may be formed integrally with the support body. The first and second anchor bodies may extend from said support body at an angle of less than 180° to each other, but preferably said first and second anchor bodies extend from said support body at a right angle to each other. More preferably, the first and second anchor bodies are square in cross-section for internal attachment within ends of tubes having square end portions and the support body has an identical cross-sectional size and shape to the first and second anchor bodies. This arrangement is such that at least upper and side surfaces of the support body may be covered from view by suitably angularly shaped end portions of said two tubes.

By making the support body of an identical cross-sectional shape and size as the anchor bodies, this enables plain ends of the tubes for interconnection by the tube connector to be processed to have suitably shaped end portions for covering the support body. Where the tubes, anchor bodies and support body are square in cross-section, this enables the plain square ends of the tunes to be processed to have complementary angularly shaped ends so as to cover from view most if not all of the surfaces of the support body thereby providing a uniform frame structure and outlook.

Preferably, the support body is provided with a third anchor body to enable respective ends of three tubes to be interconnected. The third anchor body may be formed integrally with the support body. Alternatively, the third anchor body may be an independent body and the support body may provide means for receiving said third anchor body such that said third anchor body, when received in the support body, extends from said support body perpendicularly to each of the first and second anchor bodies.

By providing a support body having a third anchor body arranged perpendicularly to the first and second anchor bodies enables many different 3-dimensional frame structures to be constructed, more particularly so where the first and second anchor bodies are themselves arranged to be perpendicular to one another, although this is not essential.

The means for receiving said third anchor body may comprise a bore formed in a central portion of the support body, said bore being adapted to receive a hollow body part of the third anchor body to thereby hold said third anchor body in place relative to the support body. It is preferable that the bore part of the support body releasably holds the hollow body part of the third anchor body. The bore may comprise any one of a plain hole providing a push fit for a plain hollow body part of the third anchor body, a threaded hole providing a threaded fit for a threaded hollow body part of the third anchor body, or a hole having snap fit means for a snap fit with a suitably provisioned hollow body part of the third anchor body.

A threaded fit provides a secure connection between the third anchor body and the support body, but it can lead to an issue of registration of its position square to the support body, although this issue can be readily overcome. A push fit has the advantage, however, of enabling easy assembly and disassembly and also enables easy rotation of the anchor body to effect registration of the position of the anchor body with the support body. Whilst a snap fit may also be used, it will be understood that any suitable means of connecting the third anchor to the support body is within the scope of the invention.

In a preferred embodiment, the tube connector has at least first and second anchor bodies and means for receiving a third anchor body as aforesaid wherein each of the first and second anchor bodies and the third anchor body are square in cross section and have the same cross-sectional size for interconnecting tubes having suitably sized square cross-sectional proximal ends and the support body has a same cross-sectional size and shape adjacent each of the anchor bodies. The arrangement is such that, when the tubes are interconnected by the tube connector, all or almost all of the surfaces of the support body are covered from view by suitably angularly shaped ends of the tubes.

Preferably, for each anchor body of the connector, its end face comprises a tapered portion facing a tapered end portion of its tightening body, and its expansion body has a pair of opposed inward facing ramp surfaces, one of which bears against the tapered portion of the anchor body and the other of which bears against a tapered portion of the tightening body. Furthermore, in a preferred embodiment, each of the first and second anchor bodies has a bolt head cavity contiguous with and wider than its through-passage, the through-passage and bolt head cavity being open to a side of the anchor body at a side opening, an end of the anchor body opposite to its tapered end comprising a tool-access opening contiguous with the bolt head cavity. The operating rod comprises a bolt comprising a threaded shank located in the through-passages of the anchor body, the expansion body and the tightening body and a head located in the bolt head cavity, the bolt having been inserted into the anchor body via the side opening, a nut bearing against or formed integrally with the tightening body and threadably engaged upon the shank, whereupon relative rotation between the bolt and nut, the tightening body moves toward the anchor body to expand the expansion body against an internal surface of the tube end. The expansion body may comprise one or more radial slots.

In a second main aspect of the invention, there is provided a frame structure comprising a plurality of tube connectors according to the invention and a plurality of tubes interconnected by said tube connectors. The frame structure may comprise a framework for constructing a shelving apparatus, a framework for constructing furniture, or a framework comprising scaffolding or the like.

In a third main aspect of the invention, there is provided a kit of parts comprising at least one tube connector according to the first main aspect of the invention and a plurality of tube.

In a fourth main aspect of the invention, there is provided a method of constructing a frame structure, comprising the step of: interconnecting proximal end portions of a plurality of tubes using a plurality of tube connectors according to the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIGS. 9(*a*) to (*e*) are more detailed and enlarged drawings depicting the connector embodiment of FIG. 7(*h*) with tubes connected to arms of said connector (FIG. 9(*c*));

FIG. 10 illustrates the assembly of square tubes to the connector of FIGS. 7(*h*) and 9;

FIG. 11(*b*) is a see-through view of the frame of FIG. 11(*a*) illustrating the use of connectors according to the invention to construct the frame of FIG. 11(*a*).

DESCRIPTION OF PREFERRED EMBODIMENTS

The following description is of preferred embodiments by way of example only and without limitation to the combination of features necessary for carrying the invention into effect.

The present invention relates generally to connectors, and particularly to tube connectors for connecting square or other shaped tubes in a 3-dimensional configuration. However, it will be understood that, although the following description of preferred embodiments describes the interconnection of tubes having a square cross section, the invention is not limited to interconnecting only tubes of square cross section but is applicable to interconnecting tubes of other cross-sectional shapes.

Figure 1:
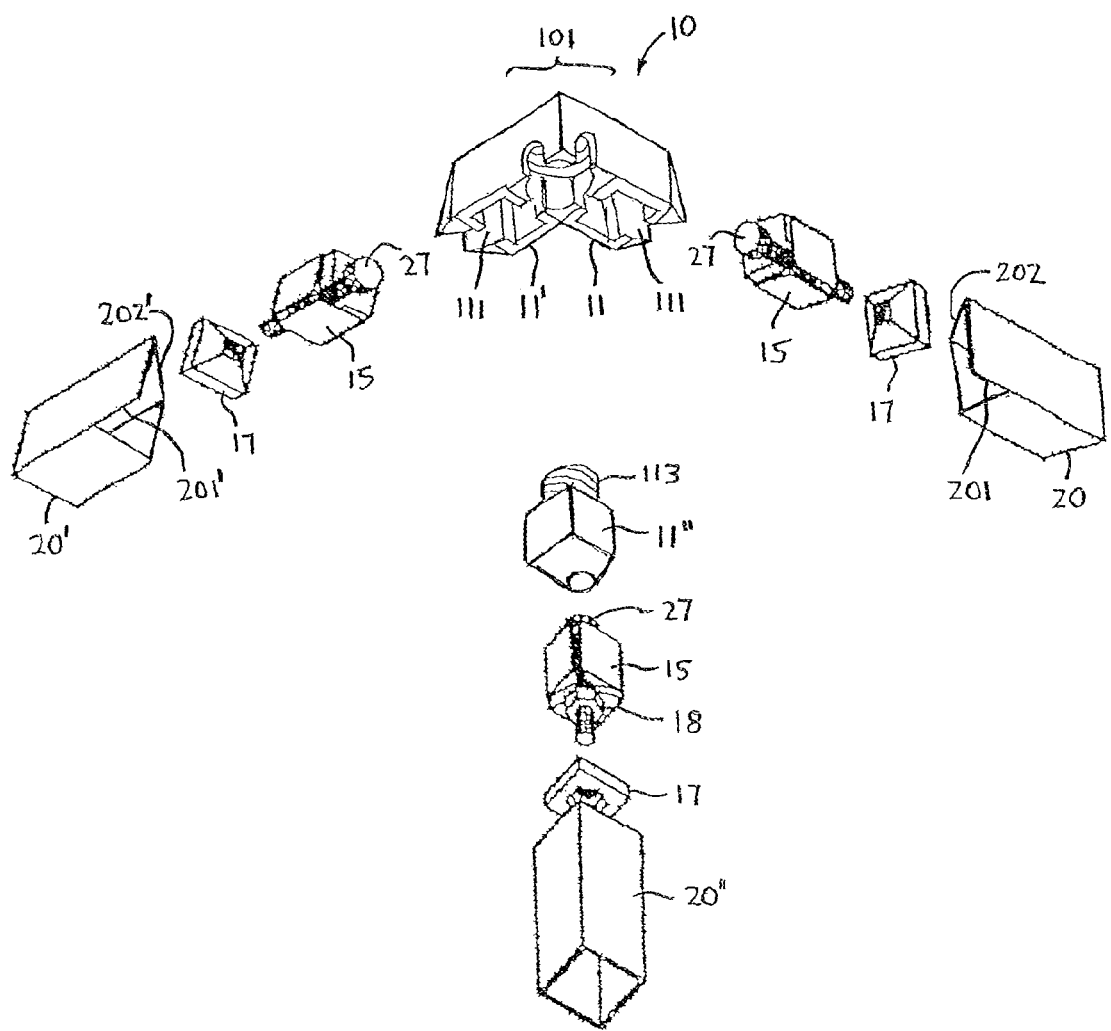
FIG. 1 is an exploded view of a connector with two horizontal arms and one vertical arm for connecting three square tubes perpendicular to each other according to an embodiment of the present invention.

FIG. 1 is an exploded view of a tube connector, generally designated by reference numeral 10, according to an embodiment of the present invention. The connector 10 includes a support body in the form of a central body 101 and a plurality of anchor bodies in the form of a plurality of horizontal and vertical arms 11, 11', 11" extending from the central body 101. The central body 101 of the connector 10 is generally in the form of a cube with the two horizontal arms 11, 11' extending therefrom in the same plane. In the illustrated embodiment, the two horizontal arms 11, 11' extend from adjacent sides of the cube-form central body 101 and are therefore perpendicular to each other. The connector 10 may be made of metal or any other suitable material or combination of materials. Whilst in the illustrated embodiment, the horizontal and vertical arms 11, 11', 11" are oriented perpendicular to each other, they may be arranged in other angular configurations to enable the construction of different geometrical forms of frameworks. In this embodiment, the horizontal arms 11, 11' are formed integrally with the central body 101, but it will be appreciated that they could each be formed independently of the central body 101 and attached thereto by any suitable fixture means such as, for example, screws, rivets, clamps, clips or the like. In contrast, the vertical arm 11" in this embodiment comprises an independently formed body, although it could also be integrally formed with the central body 101.

Each of the horizontal and vertical arms 11, 11', 11" can be inserted into an end opening of a respective square tube 20, 20', 20". In the illustrated embodiment, three square tubes 20, 20', 20" are connected together by two integral horizontal arms 11, 11' and one independent vertical arm 11". The square tubes 20, 20', 20" may be made of aluminum or any other suitable material.

3-dimensional frames of shelves and furniture of various shapes and dimensions can be built from a combination of the connectors 10 and square tubes 20, 20', 20" as will be explained hereinbelow more fully with reference to FIGS. 7 to 11. Shelf panels of wood, glass or any other suitable material may be mounted on appropriate frame parts of the 3-dimensional frame or structure to form a shelf or other furniture construction. The connectors 10 of the invention are configured such that their surfaces or some of their surfaces can be entirely hidden or almost entirely hidden from view inside the connected square tubes 20.

Figure 4:
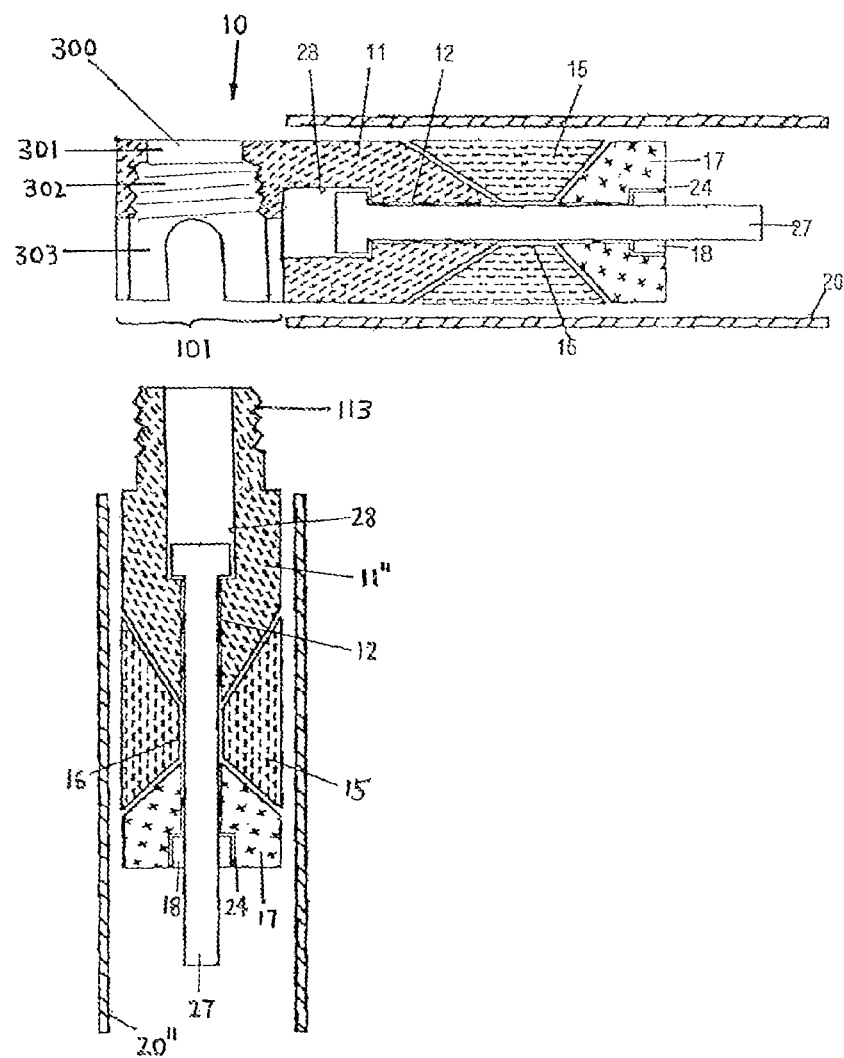
FIG. 4 is a dislocated cross sectional view of the anchor bodies according to a first embodiment of the present invention.

Each of the horizontal and vertical arms 11, 11', 11" has a lengthwise through-passage 12 (FIG. 4). Each of the horizontal and vertical arms 11, 11', 11" is connected to an expansion body 15 and a tightening body 17. Each tightening body 17 has a lengthwise through-passage and an end face facing an end face of its respective arm 11, 11', 11". Each expansion body 15 includes a through-passage and a pair of opposed end faces, one of which bears against the end face of its arm 11, 11', 11" and the other of which bears against the end face of its tightening body 17. An operating rod comprising a bolt 27 with a threaded shank and a nut 18 extends through the through-passages of each set of arm 11, 11', 11", expansion body 15 and tightening body 17. Through relative rotation of a nut 18 to its bolt 27, the operating rod is arranged to draw the tightening body 17 towards its respective arm 11, 11', 11" to thereby cause the expansion body 15 to expand radially outwardly to bear against an inside surface of the tube 20, 20', 20" and fix the tube connector 10 to the tube 20, 20' 20".

For each arm 11, 11', 11", its end face comprises a tapered portion facing a tapered end portion of its tightening body 17, and its expansion body 15 has a pair of opposed inward facing ramp surfaces, one of which bears against the tapered portion of the arm 11, 11', 11" and the other of which bears against a tapered portion of the tightening body 17. Each arm 11, 11', 11" has a bolt head cavity 28 contiguous with and wider than its through-passage 12, the through-passage 12 and bolt head cavity 28 being open to a side of the arm 11, 11', 11" at a side opening on an end of the arm opposite to its tapered end comprising a tool-access opening contiguous with the bolt head cavity 28. The nut 18 of the operating rod may bear against or be formed integrally with the tightening body 17 and is threadably engaged upon the shank of the bolt 27. The nut 18 may be accommodated within a cavity 24 (FIG. 4) in the tightening body 17. The expansion body 15 may comprise one or more radial slots.

Figure 2:
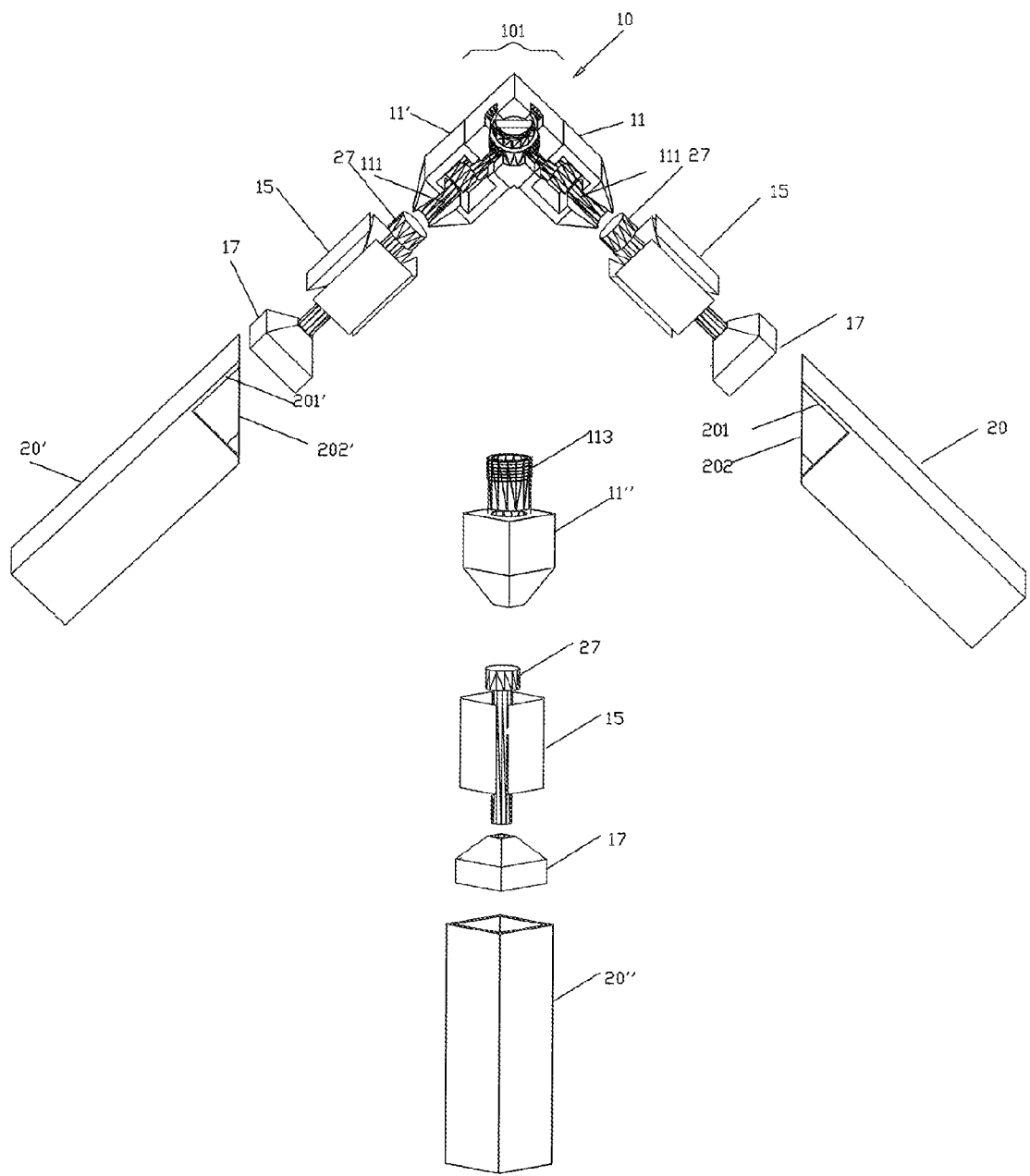
FIG. 2 is an exploded view of the connector of FIG. 1 with the vertical arm shown in a different orientation to that of FIG. 1 to help illustrate its structure.

FIG. 2 is another exploded view of the connector 10 with the vertical arm 11" shown in a different orientation with respect to the horizontal arms 11, 11' compared to that of FIG. 1 to help illustrate its structure.

The detailed structure and function of the arm 11, 11', 11", expansion body 15 and the tightening body 17 are described in the applicant's U.S. Pat. No. 7,229,230. The horizontal and vertical arms 11, 11', 11" of the present invention are therefore equivalent to the anchor bodies mentioned in the U.S. Patent.

The connector 10 of the present invention enables at least two types of tube connection. Two of these are referred to herein respectively as a type A connection and a type B connection.

In the type A connection, the bolt 27 can be inserted axially through the horizontal or vertical arm 11, 11', 11" and its expansion body 15 and tightening body 17. A bolt-driving tool, such as a hex key, for driving the bolt 27 relative to its nut 18 can also be inserted axially through the horizontal or vertical arm 11, 11', 11" to tighten or loosen the bolt 27, and in turn secure or release the square tube 20, 20', 20" from the arm 11, 11', 11".

In the type B connection, the horizontal or vertical arm 11, 11', 11" has a longitudinal side opening 111. The bolt 27 can be inserted through the longitudinal side opening 111 into the respective through-passages of the vertical arm 11, 11', 11" and its expansion body 15 and tightening body 17. The expansion body 15 may also be provided with a longitudinal side opening. The bolt-driving tool for driving the bolt 27 can be inserted at an angle through the longitudinal side opening 111 to tighten or loosen the bolt 27, and in turn secure or release the square tube 20, 20', 20". Each longitudinal side opening 111 defines a U-shaped trough which facilitates the insertion and operation of the bolt 27 and the bolt-driving tool for the type B connection.

One opening end of each square tube 20, 20' can be angularly shaped to provide a square-shaped extension 201, 201' adapted to cover one exposed vertical side of the central body 101 and a triangular extension 202, 202' adapted to cover half of an exposed top side of the central body 101. The two square tubes 20, 20' are connected to the two horizontal arms 11, 11' of the connector 10 respectively by the type B connection. When the two square tubes 20, 20' are connected to the two horizontal arms 11, 11' of the connector 10, the entire connector 10 is covered by the two connected square tubes 20, 20' except for an exposed square section on the underside side of the central body 101.

Figure 3:
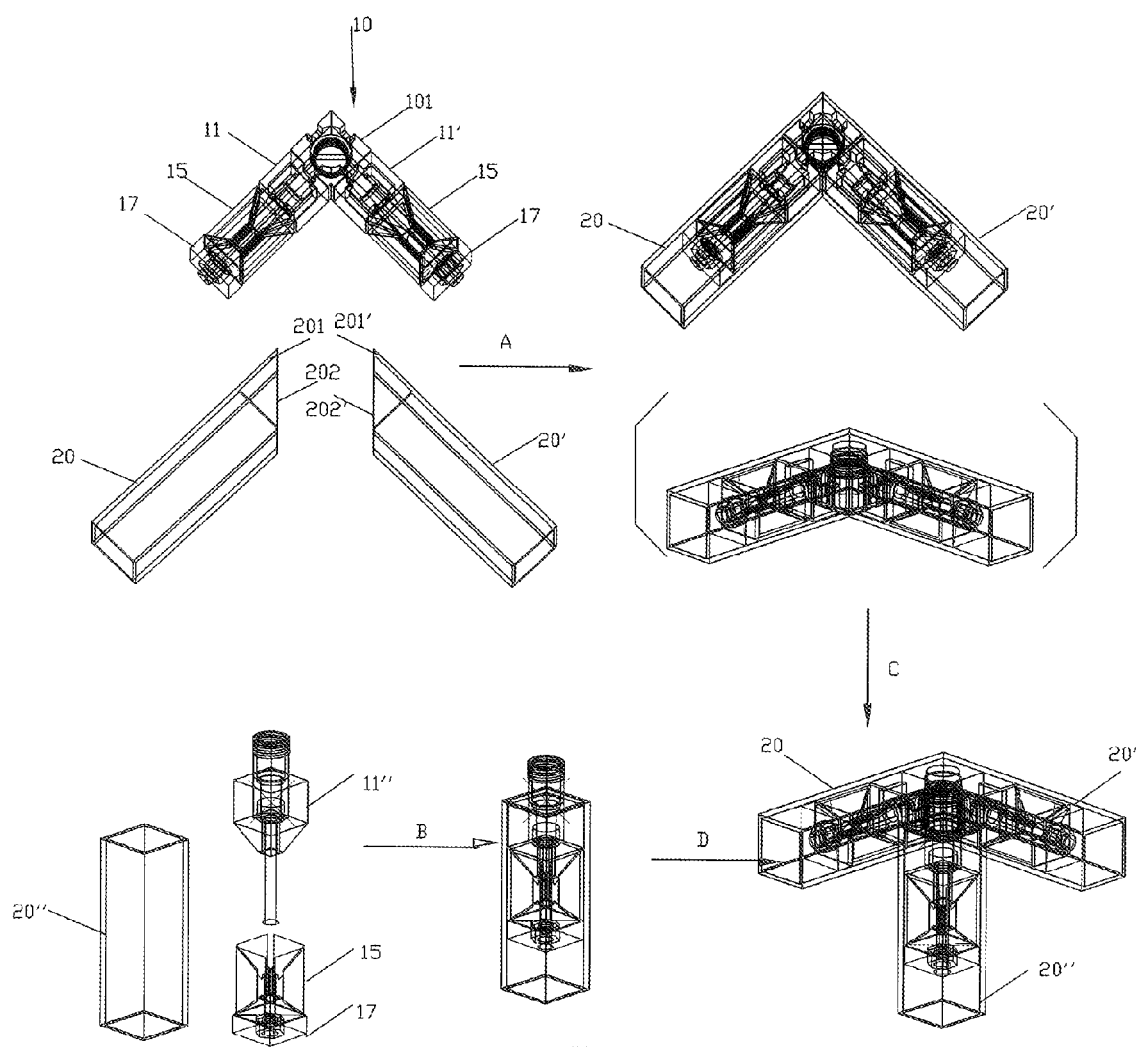
FIG. 3 illustrates one way of assembling three square tubes perpendicular to each other using the connector of FIG. 1.

FIG. 3 illustrates one way of assembling three square tubes 20, 20', 20" perpendicular to each other using the connector 10. In the drawing, the tubes are shown as though they were see-through for better understanding how the connector 10 of the present invention is covered from view by the tubes in a resulting frame structure. In the upper left part of the drawing, it can be seen that the connector 10 comprising the central body 101 and arms 11, 11', 11" are assembled with their respective expansion bodies 15 and tightening bodies 17 in readiness for the horizontal arms 11, 11' to be inserted into proximal ends of tubes 20, 20'. The ends of the tubes 20, 20' are suitably shaped such that, once the tubes are assembled on the connector, the shaped ends of the tubes 20, 20' will cover parts of the external surfaces of the connector 10, surfaces that in prior art arrangements remain exposed. Once the connector 10 is assembled with the tubes 20, 20', it results in the assembled frame part structure indicated by arrowed line A in the upper right hand part of the drawing. In the lower left hand part of the drawing, it can be seen that the vertical arm 11" of the connector 10 is independently assembled with its expansion body 15 and tightening body 17 in readiness to be assembled with tube member 20". Arrowed line B indicates the resulting frame part structure. Arrowed lines C and D indicate how the two frame part structures are combined to provide a frame corner structure for a frame such as that shown in FIG. 11. In one embodiment, as best illustrated in FIG. 4, the central body 101 is formed with a vertical through-bore 300 defining a central axis perpendicular to the two horizontal arms 11, 11' of the connector 10. The vertical through-bore 300 is formed by an upper bore 301, a middle bore 302 and a lower bore 303. The upper bore 301 has a diameter sufficient for the insertion of a bolt-driving tool for driving the bolt 27 of the vertical arm 11". The middle bore 302 has a diameter larger than the diameter of the upper bore 301. The middle bore 302 is formed with an internal screw thread. The lower bore 303 has a diameter that is larger than the diameter of the middle bore 302.

In this embodiment, the vertical arm 11" is an independently formed arm having a central through-passage or bore 12 through which bolt 27 can be inserted. A cylindrical hollow body 113 is formed on top of the vertical arm 11". The cylindrical hollow body 113 is in communication with the central through-bore of the vertical arm 11". The cylindrical hollow body 113 is formed with an external screw thread so as to be threadably engagable with the internal thread of the middle bore 302 of the central body 101. Similarly to the horizontal arms 11, 11', the vertical arm 11" is coupled with its expansion body 15 and tightening body 17 by a bolt 27 and a nut 18. The vertical arm 11" together with its expansion body 15 and tightening body 17 may be connected to the square tube 20" by the type A connection.

To assemble a frame using the connector 10 of the embodiment of FIG. 2, a user starts with the two horizontal arms 11, 11' of the connector 10. The expansion bodies 15 and the tightening bodies 17 are coupled to the two horizontal arms 11, 11' by bolts 27 and nuts 18.

The first horizontal arm 11 coupled with its expansion body 15 and tightening body 17 are inserted into one end opening of the first horizontal square tube 20; and the second horizontal arm 11' coupled with its expansion body 15 and tightening body 17 are inserted into one end opening of the second horizontal square tube 20'. The two horizontal arms 11, 11' coupled with their expansion bodies 15 and tightening bodies 17 are connected to the horizontal square tubes 20, 20' by the type B connection.

After the two horizontal square tubes 20, 20' are secured in proper positions, i.e. with the two triangular extensions 202, 202' abutting against each other to cover the upper surface of the central body 101, the user then loosens one of the two horizontal square tubes 20, 20' so as to partially expose the upper bore 301 of the through-bore 300 for subsequent insertion of a bolt-driving tool therethrough.

The vertical arm 11" coupled with its expansion body 15 and tightening body 17 is then fully screwed into the through-bore 300 of the central body 101. In this position, the vertical arm 11" may not be in registration with the central body 101. The user can turn the vertical arm 11" anticlockwise by hand through an angle between 0-90 degrees until the vertical arm 11" is in registration with the central body 101. The vertical arm 11" together with its expansion body 15 and tightening body 17 are then inserted into one end opening of a vertical square tube 20". The user then inserts a bolt-driving tool through the partially opened upper bore 301 and tightens the bolt 27 in the vertical arm 11". The vertical square tube 20" is thus connected to the vertical arm 11" by the type A connection.

The vertical arm 11" together with the vertical square tube 20" are then unscrewed from the through-bore 300 of the central body 101. The loosened horizontal square tube 20 or 20' is once again connected to the horizontal arm 11 or 11'. The unscrewed vertical arm 11' together with the vertical square tube 20' is once again screwed into the through-bore 300 of the central body 101. The assembling is completed and the three square tubes 20, 20', 20" are connected and oriented perpendicular to each other in a 3-dimensional configuration. The outer surfaces of the connector 10 are therefore entirely hidden inside the connected horizontal and vertical square tubes 20, 20' and 20" to provide a uniform frame structure.

In an alternative arrangement, the independent arm, i.e. the vertical arm or anchor body 11", can be assembled by the following steps: (1) hold and screw the independent anchor body 11" together with its expansion body 15 and tightening body 17 (the "anchor body assembly") clockwise into the connector 10 until it comes into contact with the support body, i.e. the central body 101. In this position, the square anchor body 11" is not necessarily in registration with the square central body 101). (2) turn the anchor body assembly back anticlockwise so that the square anchor body 11" is in registration with the square central body 101. (3) push one end of a square tube 20" onto the anchor body 11" and justify the proper position of the tube 20". (4) unscrew anticlockwise to detach the tube 20" and the anchor body assembly from the central body 101. (5) set the anchor body assembly a little bit inwards inside the tube 20", and tighten the anchor body assembly to the tube 20" using an operating rod/bolt-driving tool. In this position, the anchor body 11" is set at a small distance inwards from the end of the tube 20". This distance should be about half the distance between two screw lines on the external threaded part of the cylindrical hollow body 113. (6) hold and screw the tube together with the anchor body assembly clockwise back into the central body 101 until the end of the tube 20" touches the central body 101. In this position, the anchor body 11" is at a small distance from the central body 101. Finally, (7) continue screwing the tube 20" clockwise using a sufficient force until the tube 20" is in registration with the central body 101. If the hand of a user cannot provide a sufficient force, then a suitable tool may be used. For example, the user can wrap a rubber belt around the tube 20" and apply a turning force. This continued screwing of the external thread of the anchor body 11" inside the internal thread of the central body 101 induces a great force to overcome the frictional force between the expansion body 15 and the tube 20", and therefore advance the anchor body assembly a little bit outwards along the tube 20" to a final registered position. The way to set the position of the anchor body 11" inside the tube 20" previously disclosed can also be used if needed.

Figure 5:
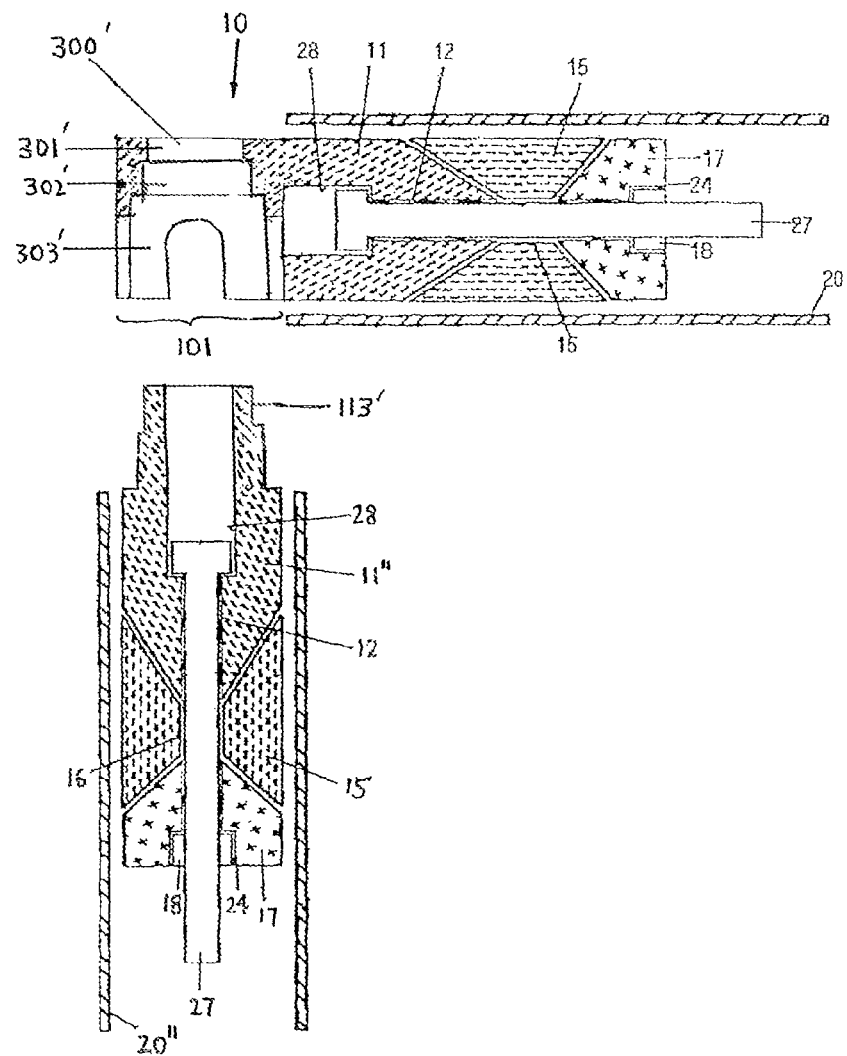
FIG. 5 is a dislocated cross sectional view of anchor bodies according to of a second embodiment of the present invention.

In another embodiment of the tube connector 10, as best illustrated in FIG. 5, the through-bore 300' of the central body 101 is formed by an upper bore 301', a middle bore 302' and a lower bore 303'. The arrangement of the upper, middle and lower bores 301', 302', 303' is largely the same as that for the embodiment of FIG. 4 save for the fact that the middle bore 302' is of a plain bore form and is not threaded.

The vertical arm 11" of this embodiment is also largely similar to that of the first embodiment of the connector 10 save for the fact that the cylindrical hollow body 113' is not formed with an external screw thread, but has a plain cylindrical surface so as to be push-fittingly engagable with the internal plain middle bore 302' of the central body 101. The fit between the plain cylindrical surface of the hollow body 113' may be a friction fit.

It will be understood that, for this embodiment of the connector 10, the through bore 300 of the central body 101 may not include the lower bore 303' but comprise only the upper and middle bores 301', 302' and consequently the cylindrical surface of the hollow body 113' of the arm 11" may extend to a greater extent down the hollow body 113' than is shown in FIG. 3.

When assembling a frame structure using this embodiment, it may not be necessary to follow all of the assembly steps described with respect to the embodiment illustrated by FIG. 4. For example, the push fit connection between the arm 11" and the central body 101 is such that it is relatively easy to register the position of the arm 11" as being square on to the central body 101 by simply rotating the arm 11" relative to the central body 101. Consequently, it is possible to assemble a frame structure by connecting first and second arms 11, 11' to their respective tubes 20, 20' using the type B connection, connecting the third arm 11" to its tube 20" using the type A connection and then attaching the third arm 11" and tube 20" combination to the central body 101 by push-fitting the hollow body 113' into the middle bore 302' and rotating the arm 11" as necessary to register its position with the central body 101.

Figure 6:
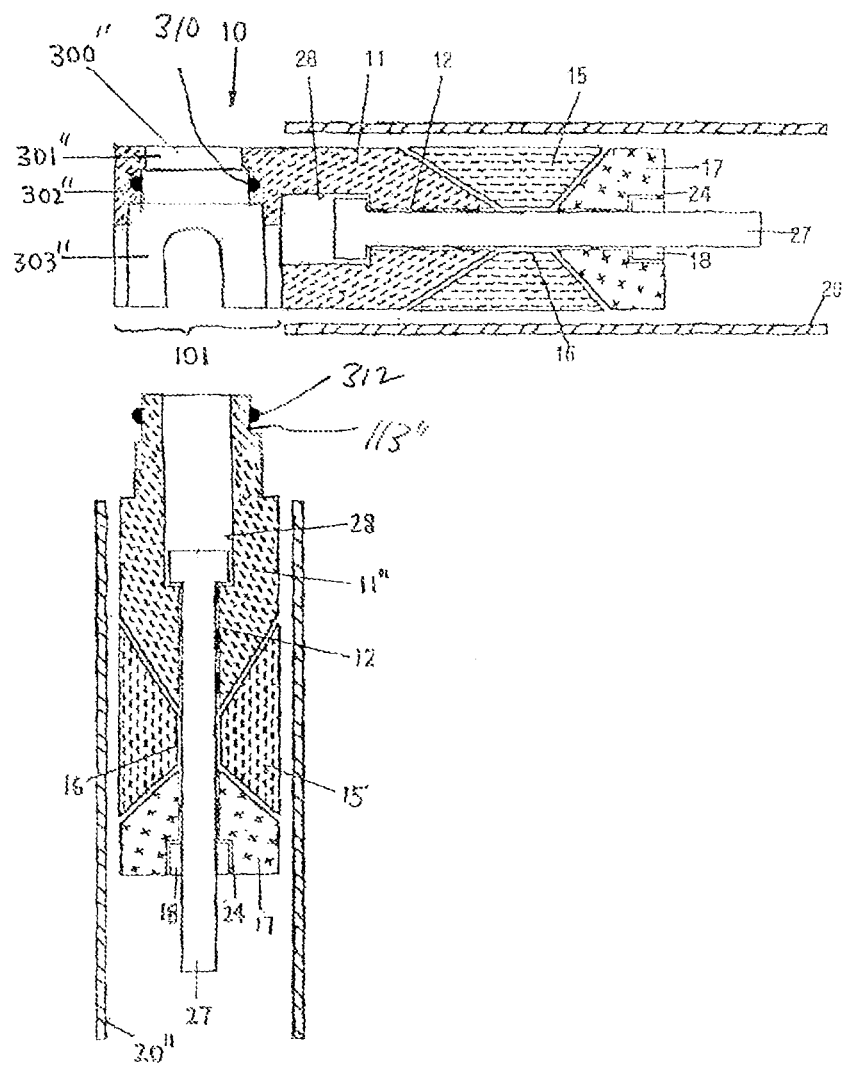
FIG. 6 is a dislocated cross sectional view of anchor bodies according to a third embodiment of the present invention.

A third embodiment of connector 10 is illustrated in FIG. 6. This embodiment is largely the same as that of the second embodiment (FIG. 5) save for the fact that the plain bore of the middle bore 302" is provided with a recess 310 and the cylindrical part of the hollow body 113" is provided with a snap ring 312 or the like to enable the arm 11" to be snap-fitted to the central body 101 by snap-fitting the ring 312 into the recess 310. Again, assembly of a frame structure is made in that the arm 11", once snap-fitted to the central body 101, can be rotated to register its position as square with the central body 101. It will be understood that any form of snap-fit means enabling rotation of the arm 11" relative to the central body 101 may be utilized and that the locations of the snap ring 312 and the recess 310 may be reversed.

In the foregoing embodiments, the central body 101 has the same cross-sectional dimensions as each of the arms 11, 11', 11". As such, the central body 101 has at least one external surface that can be seen as lying in a same plane to that of a corresponding surface on at least one of the arms 11, 11', 11". In fact, in the described embodiments, the external surfaces of the central body 101 all lie in the same planes as respective ones of corresponding external surfaces of the arms 11, 11', 11".

It should also be understood that the various embodiments of the connector 10 of the present invention may have different numbers of horizontal and vertical arms in different orientations for forming frameworks and structures of different 3-dimensional configurations.

Figure 7:
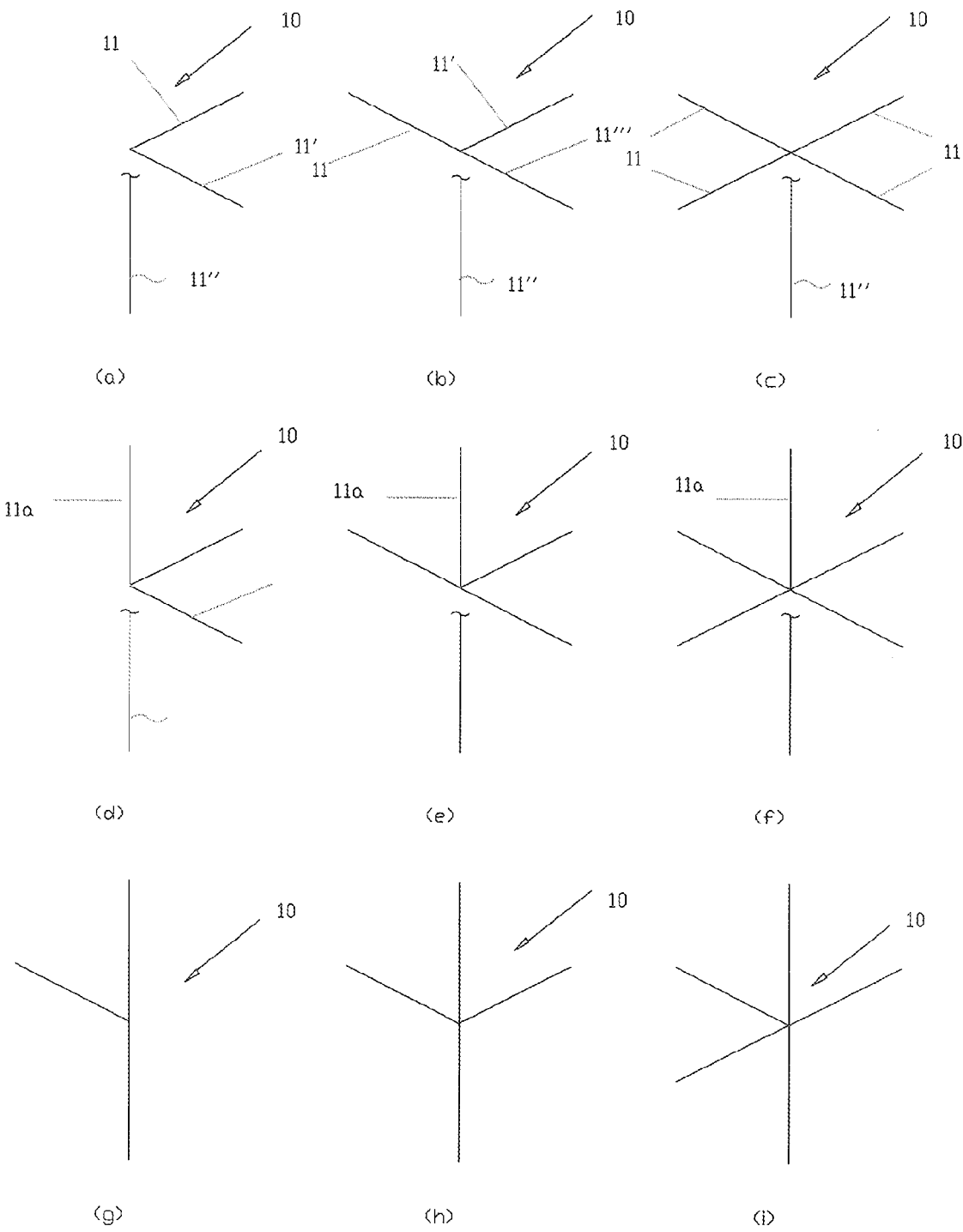
FIGS. 7(*a*) to 7(*i*) are illustrative diagrams of different connectors having different numbers of horizontal and vertical arms.
Figure 8:
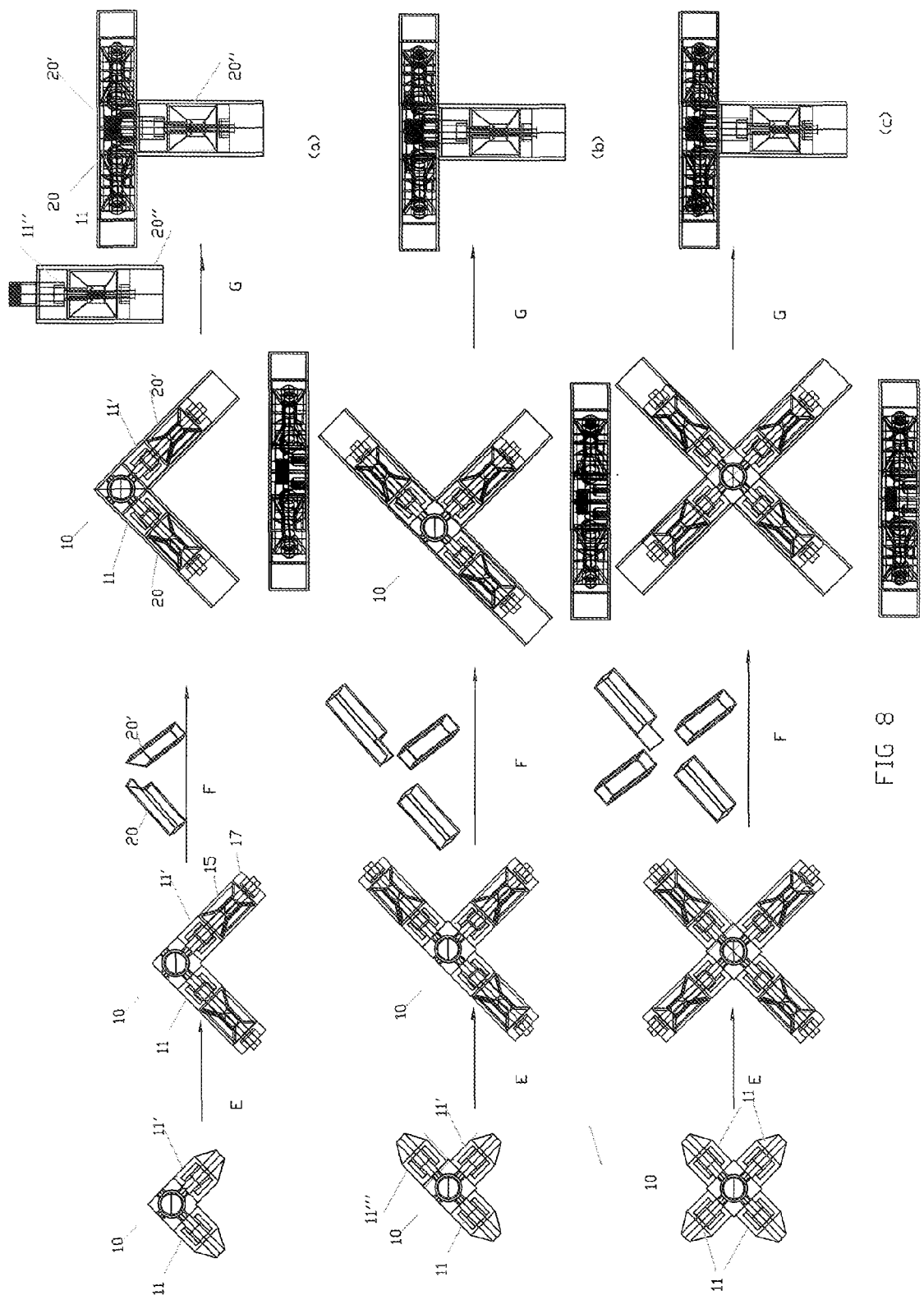
FIGS. 8(*a*) to (*f*) illustrate the assembly of square tubes with the different connectors of FIGS. 7(*a*) to (*f*)
Figure 8:
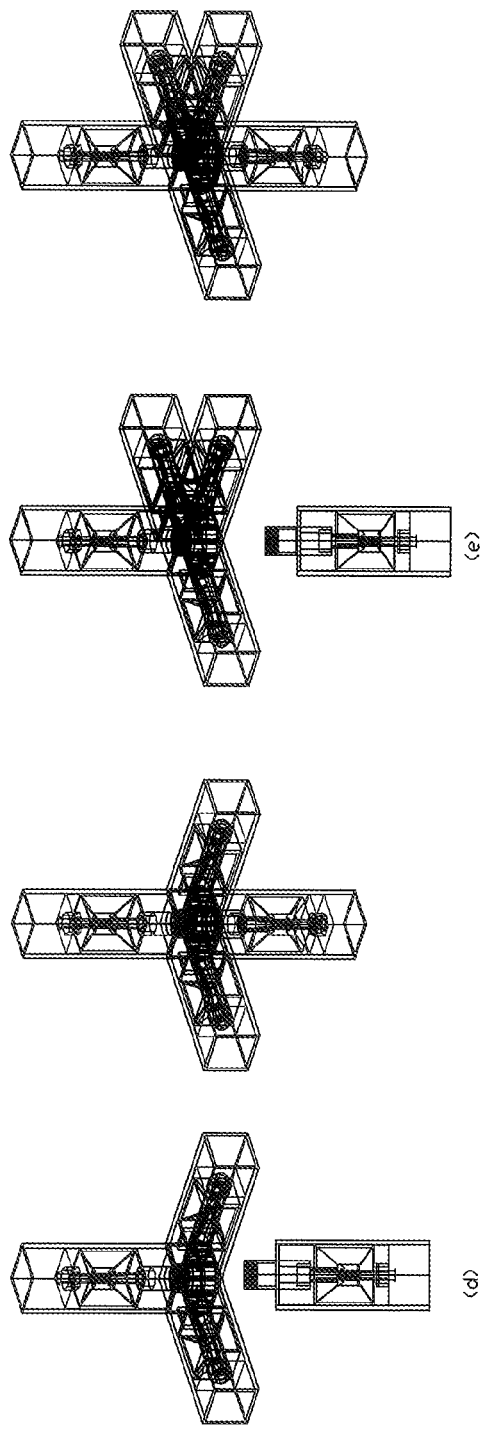

For example, FIG. 7(*a*) schematically illustrates a connector 10 with two integrally formed horizontal arms 11, 11', and one independent downwardly extending vertical arm 11" in like manner to the embodiment of FIGS. 1 to 4.

FIG. 7(*b*) schematically illustrates a connector 10 with three integrally formed horizontal arms 11, 11', 11''', and one independent downwardly extending vertical arm 11". The structure and assembling procedures are similar to those of the connector in FIG. 7(*a*), except that it has three integral horizontal arms. Appropriate tube extensions can be formed at the opening ends of the square tubes so as to cover any exposed sides of the central body so that the entire connector can be hidden inside the connected square tubes.

FIG. 7(*c*) schematically illustrates a connector 10 with four integrally formed horizontal arms 11 and one independent downwardly extending vertical arm 11". The structure and assembling procedures are similar to those of the connector in FIG. 7(*a*), except that it has four integral horizontal arms. Appropriate tube extensions can be formed at the opening ends of the square tubes so as to cover any exposed sides of the central body so that the entire connector can be hidden inside the connected tubes.

FIG. 7(*d*) schematically illustrates a connector 10 with two integrally formed horizontal arms 11, 11', one integrally formed and upwardly extending vertical arm 11*a*, and one independent downwardly extending vertical arm 11". The structure and assembling procedures are similar to those of the connector in FIG. 7(*a*). To connect a lower vertical square tube to the downwardly extending vertical arm by type A connection, a bolt-driving tool can be inserted axially through a top opening of a vertical bore of the upwardly extending vertical arm, through the vertical through-bore of the central body and then into the independent downwardly extending vertical arm where the bolt 27 is located. After the independent downwardly extending vertical arm together with its vertical square tube are unscrewed from the through-bore, the upwardly extending vertical arm can be connected to another vertical square tube by type A connection.

FIG. 7(e) schematically illustrates a connector 10 with three integrally formed horizontal arms, one integrally formed and upwardly extending vertical arm, and one independent downwardly extending vertical arm. The structure and assembling procedures are similar to those of the connector in FIG. 7(d), except that it has three integral horizontal arms. Appropriate tube extensions can be formed at the opening ends of the square tubes so as to cover any exposed sides of the central body so that the entire connector can be hidden inside the connected tubes.

FIG. 7(f) schematically illustrates a connector 10 with four integrally formed horizontal arms, one integrally formed and upwardly extending vertical arm, and one independent downwardly extending vertical arm. The structure and assembling procedures are similar to those of the connector in FIG. 7(d), except that it has four integral horizontal arms. Appropriate tube extensions can be formed at the opening ends of the square tubes so as to cover any exposed sides of the central body so that the entire connector can be hidden inside the connected tubes.

In the case of the embodiments illustrated by FIGS. 7(a) to 7(f), the connector 10 has at least one independent arm. However, in the following embodiments depicted by FIGS. 7(g) to 7(i), all of the arms are integrally formed with the central body.

FIG. 7(g) schematically illustrates a connector 10 with one integrally formed and upwardly extending vertical arm, one integrally formed and downwardly extending vertical arm, and one integrally formed and rearward extending horizontal arm. To assemble, the downwardly extending vertical arm is connected to a lower vertical square tube by type B connection, the rearward extending horizontal arm is connected to a rear horizontal square tube by type A connection, and finally the upwardly extending vertical arm is connected to an upper vertical square tube by type B connection. The upper vertical square tube can be provided with three square-shaped extensions for covering three sides of the central body.

A U-shaped bottom opening is formed on the bottom side at the opening end of the rear horizontal square tube adjacent to the central body to facilitate the insertion of a bolt-driving tool in order to make the final type B connection of the upper vertical square tube. The entire connector is covered by the connected square tubes, except for the U-shaped bottom opening formed on the bottom side the rear horizontal square tube.

FIG. 7(h) schematically illustrates a connector 10 with one integrally formed and upwardly extending vertical arm, one integrally formed and downwardly extending vertical arm, one integrally formed and rearward extending horizontal arm, and one integrally formed and sideward extending horizontal arm.

A rear horizontal square tube is connected to the rear horizontal arm by type A connection. A lower vertical square tube is connected to the downward extending vertical arm by type B connection. Another horizontal square tube is connected to the sideward extending horizontal arm by type B connection.

A U-shaped bottom opening is formed on the bottom side at the opening end of the rear horizontal square tube adjacent to the central body to facilitate the insertion of a bolt-driving tool in order to finally connect an upper vertical square tube to the upwardly extending vertical arm by type B connection.

The lower end of the upper vertical square tube can be formed with two square-shaped tube extensions to cover two exposed sides of the central body respectively. The entire connector is covered by the connected square tubes, except for the U-shaped bottom opening formed on the bottom side the rear horizontal square tube.

FIG. 7(i) schematically illustrates a connector 10 with one integrally formed and upwardly extending vertical arm, one integrally formed and downwardly extending vertical arm, one integrally formed and rearward extending horizontal arm, and two integrally formed and sideward extending horizontal arms.

A rear horizontal square tube is connected to the rear horizontal arm by type A connection. A lower vertical square tube is connected to the downward extending vertical arm by type B connection. Two horizontal square tubes are connected to the two sideward extending horizontal arms respectively by type B connection.

A U-shaped bottom opening is formed on the bottom side at the opening end of the rear horizontal square tube adjacent to the central body to facilitate the insertion of a bolt-driving tool in order to finally connect an upper vertical square tube to the upwardly extending vertical arm by type B connection.

The lower end of the upper vertical square tube is formed with one square-shaped tube extension to cover one exposed side of the central body. The entire connector is covered by the connected square tubes, except for the U-shaped bottom opening formed on the bottom side the rear horizontal square tube.

FIGS. 8(a) to (f) illustrate the assembly of square tubes with the different connectors 10 of FIGS. 7(a) to (f) to form frame part structures for a frame such as shown in FIG. 11. In the drawing, the tubes are shown as though they were see-through for better understanding of how the connector 10 of the present invention is covered from view by the tubes in a resulting frame structure. Referring to FIGS. 8(a) to (c) and moving left to right across the drawing, it can be seen from arrowed line E that, for each connector 10, the integrally formed arms or anchor bodies of the connector 10 are assembled with their respective expansion bodies 15 and tightening bodies 17 in readiness for the integral arms to be inserted into proximal ends of tubes. The ends of the tubes are suitably shaped such that, once the tubes are assembled on the connector 10 as indicated by arrowed line F, the shaped ends of the tubes will cover parts of the external surfaces of the connector 10, surfaces that in prior art arrangements remain exposed. The independent vertical arm of the connector 10 is independently assembled with its expansion body 15 and tightening body 17 in readiness to be assembled with a tube member. Arrowed line G indicates the resulting frame part structure formed from the independently assembled vertical arm when it is added to the connector 10. FIGS. 8(d) to (f) show the resulting frame part structures formed from the independently assembled vertical arms when they are added to their respective connectors 10.

FIGS. 9(a) and (b) illustrate in greater detail the embodiment of the connector 10 of FIG. 7(h). In this embodiment, the connector 10 has four anchor bodies in the form of integrally formed arms extending from a support body comprising a central body 101 (denoted by dashed lines in FIG. 9(a)). FIG. 9(b) is a view from the rear of the connector 10 as shown in FIG. 9(a). The plurality of integrally formed arms comprises an integrally formed and upwardly extending vertical arm 11, an integrally formed and downwardly extending vertical arm 11', an integrally formed and rearward extending horizontal arm 11", and an integrally formed and sideward extending horizontal arm 11'". The central body 101, which is generally in the form of a cube, and each of the arms 11, 11', 11", 11'" is square in cross-section and each arm extends outwardly from a respective face of the central body 101 at a right-angle to said face. Consequently, a number of the arms extend outwardly from the central body 101 perpendicularly to each other.

Each of the horizontal and vertical arms 11, 11', 11", 11'" can be inserted into an end opening of a respective square tube 20, 20', 20", 20'" as can be seen in FIG. 9(c) which shows the connector 10 generally as viewed in FIG. 9(b) with tubes connected to each of the arms.

In like manner to the aforedescribed embodiments of the connector 10, each of the horizontal and vertical arms 11, 11', 11", 11'" has a lengthwise through-passage 12 and is connected to an expansion body and a tightening body (not shown). Each arm 11, 11', 11", 11'" also has a bolt head cavity 28 contiguous with and wider than its through-passage 12, the through-passage 12 and bolt head cavity 28 being open to a side of the arm 11, 11', 11", 11'" at a side opening comprising a tool-access opening 111 contiguous with the bolt head cavity 28.

Referring again to FIGS. 9(a) and (b), it can be seen that at least one external surface 101a of the central body 101 lies in a same plane as a corresponding adjoining surface 11z of at least one of the arms 11, 11', 11" thereby enabling a suitably shaped end portion of a tube 20, 20', 20", 20'" to cover all or at least a part of said external surface 101a when the tube is connected to a respective one of the arms. In fact, the central body 101 of this embodiment has at least two external surfaces that lie in the respective planes of corresponding adjoining surfaces of two or more of said arms. It will be understood that the external surface 101a of the central body 101 may lie in a plane below that of the corresponding surface of the arm in order for a suitably shaped end portion of a tube to cover all or at least part of said external surface 101a.

In this embodiment, the central body has end faces 102 extending around some but not all of its sides at the junctions between the central body 101 and the arms 11, 11', 11", 11'". As such, plain end portions of some of the tubes 20, 20', 20", 20'" abut said end faces when the arms are fitted into proximal ends of the tubes.

Referring to FIG. 9(b), it can be seen that U-shaped apertures 104 are formed at the junctions of one of the arms 11" with the central body, although only one such aperture 104 is required to enable tubes with suitably shaped ends to be fitted to said connector 10 to thereby cover the major surfaces of said central body 101 and hide it from view.

To enclose the central body 101 of the connector 10 and as illustrated in FIG. 9(c), a rear horizontal square tube 20" is connected to the rear horizontal arm 11" by a type A connection. A lower vertical square tube 20' is connected to the downward extending vertical arm 11' by type B connection. Another horizontal square tube 20'" is connected to the sideward extending horizontal arm 11'" by a type B connection.

As can be seen in FIGS. 9(c) and 9(e), a U-shaped bottom opening 20a is formed on the bottom side at an open end of the rear horizontal square tube 20" adjacent to the central body 101 to facilitate the insertion of a bolt-driving tool in order to finally connect an upper vertical square tube 20 to the upwardly extending vertical arm 11 by type B connection. The bottom opening 20a of the tube coincides in use with one of the U-shaped apertures 104 formed at the junctions of one of the arms 11" with the central body.

As can be seen in FIG. 9(d), a lower end of the upper vertical square tube can be formed with two square-shaped tube extensions 20b, c, b to cover two exposed sides of the central body 101 respectively, the two exposed sides being the only sides of the central body 101 not hidden from view when the first three tubes 20', 20", 20'" are secured to the central body 101. Thus, the entire connector 10 is, in the main, covered by the connected square tubes, except for the U-shaped bottom opening 20a formed on the bottom side the rear horizontal square tube 20".

For the connector 10 of FIG. 9, the slanted through-passage 104' or aperture 104 and corresponding slot 20a in the tube for receiving the operating rod is important as it is utilised to enable the last tube to be fixed to the frame to cover the entire connector 10. Only a small opening 20a appears on the bottom surface at each end of the tube, but since the small openings 20a are located on the bottom surface of the tubes, they are not visible from above.

FIG. 10 illustrates the assembly of square tubes to the connector 10 of FIGS. 7(h) and 9. In the drawing, arrowed lines H, I, J and K indicate the assembly of expansion bodies 15 and tightening bodies 17 onto the integral anchor bodies 11, 11', 11", 11'" of the central body 101 of the connector 10, followed by the assembly of suitably shaped tubes 20, 20', 20", 20'" onto the anchor body assemblies to provide a frame structure part for a frame such as that shown in FIG. 11.

Figure 11A:
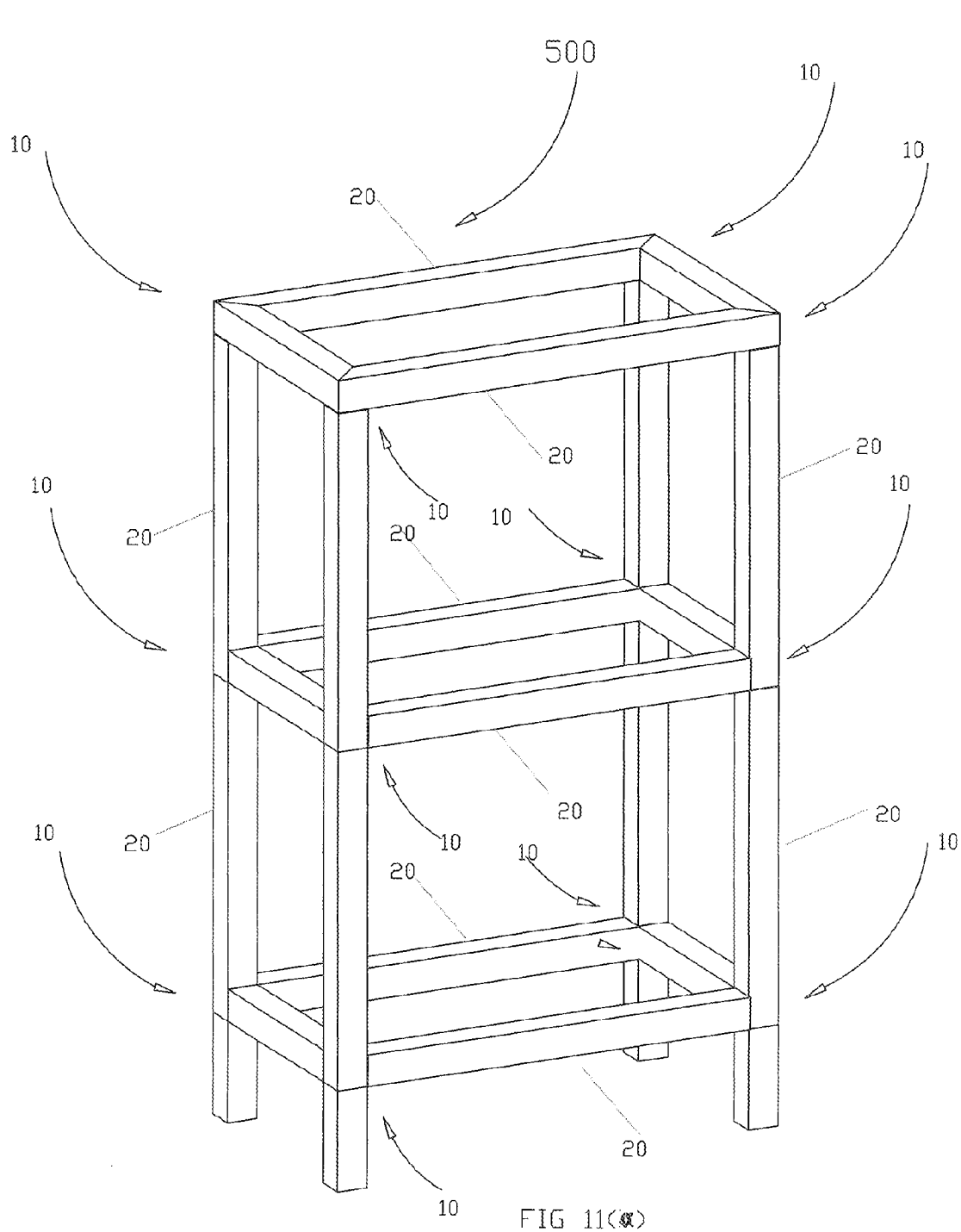
FIG. 11(*a*) is an example of a frame structure that can be constructed using the tube connectors of the invention.
Figure 11B:
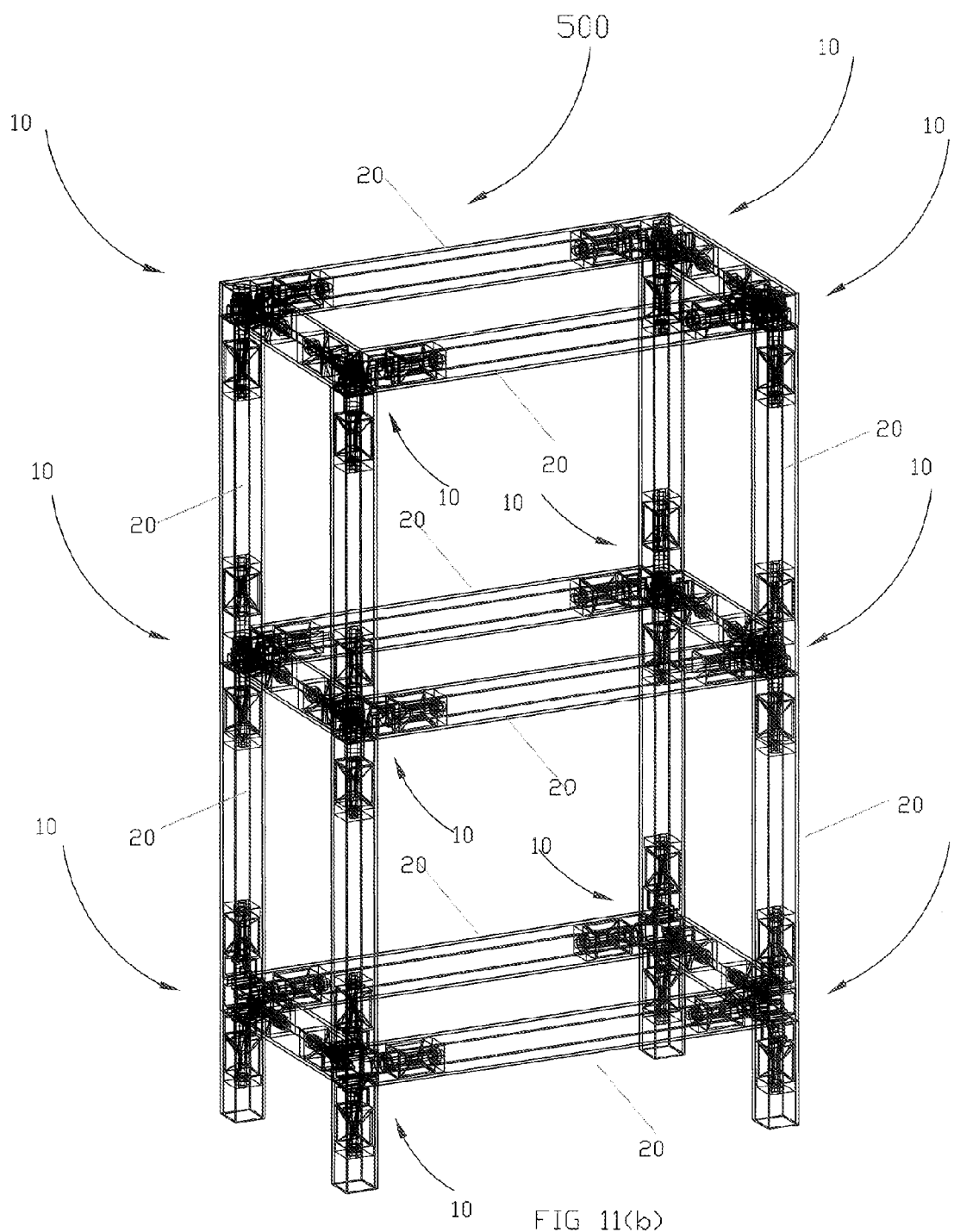

The various embodiments of tube connectors described herein may be used with tubular frame members, i.e. tubes, to form a variety of different geometrical frame structures for use in shelving, manufacturing furniture or construction such as scaffolding. Referring to FIGS. 11(a) and (b), provided is an example of a frame structure 500 that may be constructed from tube connectors 10 and tubular frame members 20 in accordance with the principles described herein. The tube connectors 10 are generally hidden from view by dint of their surfaces being covered from view by suitably shaped ends of the tubes 20, but FIG. 11(b) provides a view of the relationship of the connectors 10 to the tube 20 in forming a frame 500. It will be understood that the frame structure of FIG. 11 is provided merely by way of example and is in no way limitative of the type and variety of frame structures that may be constructed according to the invention.

The connectors of the invention are such that they are readily assemblable with tubes to form frames or the like and such that they are suitable for the "do it yourself" (DIY) market where the tubes and connectors can be sold in kit form for self-assembly at home, for example. Another advantage of the invention is that the parts can be easily disassembled and reused or recycled.

In general, there is provided a tube connector for internal attachment to an end of a tube. The tube connector comprises a support body and at least one anchor body extending from said support body. The anchor body has a lengthwise through-passage. Associated with the anchor body is a tightening body having a lengthwise through-passage and an end face facing an end face of the anchor body. Also provided is an expansion body comprising a through-passage and a pair of opposed end faces, one of which bears against the end face of the anchor body and the other of which bears against the end face of the tightening body. An operating rod extends through the through-passages of the anchor body, the expansion body and the tightening body. The operating rod is arranged to draw the tightening body towards the anchor body to thereby cause the expansion body to expand radially outwards to bear against an inside surface of the tube and fix the tube connector to the tube. The support body has at least one external surface which lies in a same or lower plane as that of a corresponding external surface of one of the at least one anchor body such that at least a part of said external surface of the support body can be covered from view by a suitably shaped end of the tube when it is connected to said one of the at least one anchor body. The support body may have a cross-sectional size that is equal or less than that of the anchor body such that at least a part of the support body surface is covered from view by the end of the tube.

Also provided is a frame structure comprising a plurality of tube connectors according to the invention and a plurality of tubes interconnected by said tube connectors a method of constructing a frame structure, comprising the step of: interconnecting proximal end portions of a plurality of tubes using a plurality of tube connectors according to the invention.

The invention generally relates to the use of connectors that connect tubes together to construct a framework for shelves, furniture and even a framework for scaffolding, where the connectors are largely hidden from view by ends of the tubes with perhaps at most only a small aperture or slot in an end of one of the tubes being visible when the framework is constructed. Each connector comprises a support body and several anchor bodies that may be formed integrally with the support body or be independent from it, but connectable to it. At least one face of the support body is sufficiently open enough to enable a tool to be inserted into the connector to fix tubes onto the anchor bodies. Exposed faces of the support body that are coplanar with corresponding faces of the anchor bodies are covered from view by suitably shaped ends of the tubes.

Associated with each anchor body is a tightening body having a lengthwise through passage and an end face facing the end face of the anchor body. Also provided is an expansion body comprising a through-passage and a pair of opposed end faces, one of which bears against the end face of the anchor body and the other of which bears against the end face of the tightening body. An operating rod is arranged to draw the tightening body towards the anchor body to thereby cause the expansion body to expand radially outwards to bear against the inside surface of the tube and fix the tube connector to the tube.

The support body has six (square) faces so there are six anchor bodies at a maximum. For any face of the support body that does not support an anchor body, it is preferably formed to be coplanar with a corresponding face of another anchor body which allows an end of a tube with a suitably shaped end portion to cover that face of the support body. A U-shaped aperture with a slanted through passage are provided at a junction of at least one of the anchor bodies with the support body. This allows a working tool to be inserted into the connector to fix at least a final tube to the connector.

Where the connector has at least one independent anchor body, tubes should firstly be connected to the anchor bodies which are integrally formed with the support body prior to attaching a tube to the independent formed anchor body. While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A tube connector for internal attachment to ends of a plurality of tubes, comprising:
   a support body;
   a plurality of anchor devices; each anchor device comprising:
      an anchor body extending from said support body, said anchor body having a lengthwise through-passage;
      a tightening body having a lengthwise through-passage and an end face facing an end face of the anchor body;
      an expansion body comprising a through-passage and a pair of opposed end faces, one of which bears against the end face of the anchor body and the other of which bears against the end face of the tightening body;
      an operating rod extending through the lengthwise through-passages of the anchor body, the expansion body and the tightening body, the operating rod being arranged to draw the tightening body towards the anchor body to thereby cause the expansion body to expand radially outwards to bear against an inside surface of a tube and fix said tube connector to said tube in an operative configuration;
   wherein the support body has a plurality of external surfaces which each lies in a plane relative to that of a corresponding external surface of a respective anchor body such that at least a part of said external surface of the support body is covered from view by a shaped end of one of the plurality of tubes when said tube is connected to said anchor body whereby shaped ends of the plurality of tubes substantially cover the plurality of external surfaces of the support body from view; and
   wherein the plurality of tubes are connected to the tube connector such that only one of the plurality of tubes requires a slot or an aperture formed at its end adjacent the support body to enable a tool to be inserted into the connector to connect said connector to an inside surface of a last one of the plurality of tubes for substantially covering the plurality of external surfaces of the support body from view.

2. A tube connector as claimed in claim 1, wherein a tool access aperture is formed at a junction of the anchor body with the support body to enable a tool to be inserted into the connector for fitting a tube with a shaped end to said connector.

3. A tube connector as claimed in claim 2, wherein the connector is provided with a slanted through-passage in communication with the tool access aperture to enable a tool inserted into the connector to reach the operating rod of the anchor device and cause the operating rod to draw the tightening body towards the anchor body to fix the tube connector to the tube in an operative configuration.

4. A tube connector as claimed in claim 2, wherein the slot or aperture is formed in a position corresponding to the tool access aperture to enable a tool to be inserted via the slot or aperture into the tool access aperture to fix said connector to the inside surface of the tube.

5. A tube connector as claimed in claim 1, wherein the plurality of external surfaces of the support body lies in a same plane as that of the corresponding adjoining external surfaces of said anchor bodies.

6. A tube connector as claimed in claim 1, wherein the plurality of anchor bodies are formed integrally with the support body.

7. A tube connector as claimed in claim 6, wherein the support body and the anchor bodies all being square in cross-section and each of the anchor bodies extending outwardly at a right angle from a respective support surface of the support body.

8. A tube connector as claimed in claim 1, wherein the support body has a cross-sectional size that is equal or less than that of the anchor body such that the support body can be substantially covered from view by shaped ends of the tubes when connected to said anchor bodies.

9. A tube connector as claimed in claim 1, wherein the tube connector is provided with at least first and second anchor bodies extending from said support body, the arrangement being such that at least upper and/or side surfaces of the support body are covered from view by end portions of two tubes interconnected by said tube connector.

10. A tube connector as claimed in claim 9, wherein said support body is provided with a third anchor body to enable respective ends of three tubes to be interconnected.

11. A tube connector as claimed in claim 10, wherein said support body provides means for receiving said third anchor body such that said third anchor body, when received in the support body, extends from said support body perpendicularly to each of the first and second anchor bodies.

12. A tube connector as claimed in claim 11, wherein said means for receiving said third anchor body comprises a bore formed in a central portion of the support body, said bore being adapted to receive a hollow body part of the third anchor body to thereby hold said third anchor body in place relative to the support body.

13. A tube connector as claimed in claim 12, wherein said bore receives said hollow body part of the third anchor body to thereby releasably hold said third anchor body in place relative to the support body.

14. A tube connector as claimed in claim 8, wherein the tube connector is provided with at least first and second anchor bodies extending from said support body and means for receiving a third anchor body such that said third anchor body when received by the support body extends perpendicularly therefrom relative to said first and second anchor bodies and wherein each of the first and second anchor bodies and the third anchor body are square in cross section and have the same cross-sectional size for interconnecting tubes having sized square cross-sectional ends, and the support body has a same cross-sectional size and shape as each of the anchor bodies, the arrangement being such that, when the tubes are interconnected by the tube connector, all of the surfaces of the support body are covered from view by shaped ends of the tubes.

15. A tube connector as claimed in claim 14, wherein, for each anchor body, its end face comprises a tapered portion facing a tapered end portion of its tightening body, and its expansion body has a pair of opposed inward facing ramp surfaces, one of which bears against the tapered portion of the anchor body and the other of which bears against a tapered portion of the tightening body.

16. A tube connector as claimed in claim 15, wherein each of the first and second anchor bodies has a bolt head cavity contiguous with and wider than its through-passage, the through-passage and bolt head cavity being open to a side of the anchor body at a side opening, an end of the anchor body opposite to its tapered end comprising a tool-access opening contiguous with the bolt head cavity, the operating rod comprises a bolt comprising a threaded shank located in the through-passages of the anchor body, the expansion body and the tightening body and a head located in the bolt head cavity, the bolt having been inserted into the anchor body via the side opening, a nut bearing against or formed integrally with the tightening body and threadably engaged upon the shank, whereupon relative rotation between the bolt and nut, the tightening body moves toward the anchor body to expand the expansion body against an internal surface of the tube end.

17. A frame structure comprising a plurality of tube connectors as claimed in claim 1 and a plurality of tubes interconnected by said tube connectors.

18. A kit of parts comprising at least one tube connector as claimed in claim 1 and a plurality of tubes.

19. A tube connector as claimed in claim 1, wherein the support body comprises a cube with the anchor body extending from a face of said cube and wherein, for a further face of the cube bordering the face from which the anchor body extends where such further face does not itself support an anchor body, said further face lies in a plane relative to that of a corresponding external surface of the anchor body such that at least a part of said further face can be covered from view by shaped ends of the tubes when connected to said anchor bodies.

20. A tube connector as claimed in claim 19, wherein at least one face of the cube comprises a working surface having a U-shaped lengthwise passage, and a circular lengthwise through passage is provided in the body of the cube such that the U-shaped passage circular through passage enable a tool to access operating rods of anchor bodies extending from any of the five remaining faces of the cube.

21. A tube connector as claimed in claim 20, wherein the working surface of the cube is adapted to receive an independent anchor body.

22. A tube connector as claimed in claim 21, wherein the independent anchor body is attachable to the working surface by a screw-fitting to the cube.

23. A tune connector as claimed in claim 19, wherein the anchor body is square in cross-section and adapted to receive an end of a tube having a square cross-section, an internal square bore of the tube being sufficiently large enough to receive the anchor body and yet be gripped by the anchor body when the expansion body is cause to expand radially.

* * * * *